(12) United States Patent
Brandenburger et al.

(10) Patent No.: US 7,381,472 B2
(45) Date of Patent: Jun. 3, 2008

(54) DURABLE POLYESTER COATING

(75) Inventors: Larry B. Brandenburger, Circle Pines, MN (US); Abdel Hamid Yassin, Shoreview, MN (US); Ted Robert Best, Plano, TX (US)

(73) Assignee: Valspar Sourcing, Inc., Minneapolis, MN (US)

( * ) Notice: Subject to any disclaimer, the term of this patent is extended or adjusted under 35 U.S.C. 154(b) by 123 days.

(21) Appl. No.: 10/523,541

(22) PCT Filed: Aug. 5, 2003

(86) PCT No.: PCT/US03/24296

§ 371 (c)(1),
(2), (4) Date: Jun. 17, 2005

(87) PCT Pub. No.: WO2004/016426

PCT Pub. Date: Feb. 26, 2004

(65) Prior Publication Data

US 2005/0227100 A1    Oct. 13, 2005

Related U.S. Application Data

(60) Provisional application No. 60/405,931, filed on Aug. 26, 2002, provisional application No. 60/403,864, filed on Aug. 15, 2002.

(51) Int. Cl.
*B32B 27/00* (2006.01)
*C08G 63/127* (2006.01)

(52) U.S. Cl. .................... 428/482; 525/441; 528/308

(58) Field of Classification Search ............... 428/480, 428/482; 525/441; 528/308
See application file for complete search history.

(56) References Cited

U.S. PATENT DOCUMENTS

| 2,940,944 | A | | 6/1960 | Christenson | |
|---|---|---|---|---|---|
| 2,978,437 | A | | 4/1961 | Christenson | |
| 3,678,128 | A | | 7/1972 | Riemhofer et al. | |
| 3,931,418 | A | * | 1/1976 | Risken | 427/120 |
| 4,071,578 | A | * | 1/1978 | Lasher | 525/158 |
| 4,088,619 | A | * | 5/1978 | Holzrichter | 524/539 |
| 4,393,121 | A | * | 7/1983 | Tobias et al. | 428/458 |
| 4,968,775 | A | * | 11/1990 | Toman et al. | 528/272 |
| 5,229,214 | A | * | 7/1993 | Maze et al. | 428/458 |
| 5,246,557 | A | | 9/1993 | Hughes et al. | |
| 5,380,816 | A | * | 1/1995 | Sullivan | 427/385.5 |
| 5,739,204 | A | * | 4/1998 | Piana | 524/539 |
| 5,840,827 | A | | 11/1998 | Zupancic et al. | |
| 5,976,706 | A | * | 11/1999 | Yezrielev et al. | 428/482 |
| 6,077,917 | A | * | 6/2000 | Tachika et al. | 525/438 |
| 6,413,648 | B1 | * | 7/2002 | Heyenk et al. | 428/482 |
| 6,897,265 | B2 | * | 5/2005 | Algrim et al. | 525/444 |
| 7,071,267 | B2 | * | 7/2006 | Algrim et al. | 525/444 |
| 2001/0047062 | A1 | | 11/2001 | Zhou et al. | |

FOREIGN PATENT DOCUMENTS

| GB | 835588 | 5/1960 |
|---|---|---|
| GB | 1 518 495 A | 7/1978 |

* cited by examiner

*Primary Examiner*—Margaret G Moore
(74) *Attorney, Agent, or Firm*—IPLM Group, P.A.

(57) ABSTRACT

The present invention provides a coating composition, and coated substrates and articles. The coating composition includes a binder containing a polyester resin that is formed using at least one aromatic, dicarboxylic acid and at least one asymmetric diol. The present invention also provides coating compositions that may be used on articles where excellent outdoor durability is desired. A method of coating and fabricating a substrate is also included.

25 Claims, No Drawings

DURABLE POLYESTER COATING

RELATED APPLICATION

This application claims the benefit of PCT Application No. PCT/US2003/024296 filed Aug. 5, 2003, entitled DURABLE POLYESTER COATING, which in turn claims the benefit of U.S. provisional application Ser. No. 60/405,931, filed Aug. 26, 2002 and No. 60/403,864, filed Aug. 15, 2002, both entitled DURABLE POLYESTER COATING, the disclosures of all of which are herein incorporated by reference.

BACKGROUND

Coil products are used to make a variety of useful products. As an example, ranges, refrigerators, rain gutters and downspouts are often fabricated with coil products. These coil products are typically coated before introduction into the marketplace. The coating protects the substrate from outdoor elements and degradation (e.g., corrosion and UV degradation) as well as providing a smooth and even appealing appearance.

Some of these coil products are made using "coil coated" sheet stock. A typical coil coated sheet stock may include a roll of metal that is unwound, coated and rolled again for storage prior to fabrication. It is desirable that a coating composition applied to sheet stock meet the fabrication requirements that the sheet stock will subsequently be subjected to, as well as protect the coil coated sheet stock substrate.

Since most coil coated substrates are formed after coating, the coating composition used should meet unique requirements for the intended use. These requirements include excellent durability, flexibility, impact resistance, and the like. Unfortunately, such coating compositions are quite expensive and modification of existing products adds extra cost to the coatings.

From the foregoing, it will be appreciated that what is needed in the art is a coil coating composition (preferably a low cost coating composition) that meets these requirements when applied to a substrate. Such coating compositions, articles made using these coating compositions, and methods for preparing the coating compositions and articles are disclosed and claimed herein.

SUMMARY

In one embodiment the present invention provides a coated substrate that includes a substrate coil, and a coating composition that is preferably applied to at least one major surface of the coil. The coating composition preferably comprises a binder having a polyester resin that is formed using at least one aromatic dicarboxylic acid, at least one symmetric diol in an amount greater than 50 weight percent based on the total weight of polyols and at least one asymmetric diol in an amount greater than 20 weight percent based on the total weight of polyols. The glass transition temperature (Tg) of the coating composition is preferably at least about 35° C., more preferably at least about 40° C. The flexibility of the coated substrate is preferably at least 3T with no tape off, more preferably at least 2T with no tape off, most preferably at least 1T with no tape off, and optimally 0T with no tape off.

In another embodiment, the present invention provides a coated substrate that includes a substrate coil and a coating composition. The coating composition preferably comprises a binder having a polyester resin that preferably is formed using at least one aromatic dicarboxylic acid, at least one symmetric diol in an amount greater than 50 weight percent based on the total weight of polyols and at least one asymmetric diol in an amount greater than 20 weight percent based on the total weight of polyols, and optionally a crosslinker. The coating composition provided is preferably storage stable, has a glass transition temperature of at least about 35° C., and more preferably at least about 40° C. The flexibility of the coated substrate is preferably at least 3T with no tape off, more preferably at least 2T with no tape off, most preferably at least 1T with no tape off, and optimally 0T with no tape off.

In yet another embodiment, the present invention provides a method of coating and fabricating a coil. The method of the present invention preferably includes providing a coating composition that includes a binder having polyester resin, applying the coating composition onto at least one major surface of the substrate coil, and hardening the coating composition. The polyester resin preferably is formed using at least one aromatic dicarboxylic acid, at least one symmetric diol in an amount greater than 50 weight percent based on the total weight of polyols and at least one asymmetric diol in an amount greater than 20 weight percent based on the total weight of polyols. The coating composition optionally includes a crosslinker.

In yet another embodiment, the present invention provides a coating composition that includes a binder. The binder preferably comprises a polyester resin that is formed using at least one aromatic, dicarboxylic acid and at least one asymmetric diol, and optionally a crosslinker. The coating composition of the present invention is preferably storage stable and has a glass transition temperature of at least about 35° C.

DETAILED DESCRIPTION

The present invention provides coating compositions, coated substrates and coated articles (e.g., appliances and rain gutters). The coating composition preferably comprises a binder that includes a polyester resin (that itself preferably is formed using an aromatic, dicarboxylic acid and at least one asymmetric diol), an optional crosslinker, and other optional additives (e.g., flow modifiers, viscosity modifiers, etc.).

In one embodiment, the polyester resin is formed by reacting compounds having reactive functional groups, for example, compounds having alcohol, acid, anhydride, acyl or ester functional groups. Alcohol functional groups, for example, are known to react, under proper conditions, with acid, anhydride, acyl or ester functional groups to form a polyester linkage.

Suitable compounds for use in forming the polyester resin include mono-, di-, and multi-functional compounds. Difunctional compounds are presently preferred. Suitable compounds include compounds having reactive functional groups of a single type (e.g.,mono-, di-, or poly-functional alcohols; or mono-, di-, or poly-functional acids) as well as compounds having two or more different types of functional groups (e.g., a compound having both an anhydride and an acid group, or a compound having both an alcohol and an acid group, etc.).

Preferably, at least a portion of the compounds used to form the polyester resin comprises an aromatic, dicarboxylic acid and a selection of one or more diols. While not intending to be bound by theory, it is believed that the use of the combination of an aromatic, dicarboxylic acid and a selection of one or more diols in the backbone of the resin contributes to improved durability and/or increased UV stability (which is associated with outdoor weathering stability).

Although the present invention is not so limited, it is convenient to discuss and exemplify polyester resins formed from the reaction of selected diols and acid (or anhydride) compounds, wherein a portion of the acid (or anhydride) compound comprises a dicarboxylic acid.

If desired, the polyester resin may comprise an aliphatic acid, ester or anhydride compound, however, the amount of such aliphatic compound should be limited. Suitable aliphatic acid, ester and anhydride compounds include aliphatic carboxylic acids such as succinic acid, glutaric acid, adipic acid, pimelic acid, suberic acid, azelaic acid, sebacic acid, diglycolic acid, 1,12-dodecanoic acid, tetrapropenyl succinic acid, maleic acid and its anhydride, fumaric acid, itaconic acid, malic acid, dimer fatty acids (e.g., EMPOL 1016), esters of these acids, etc. Presently preferred compounds include adipic acid and azelaic acid.

Suitable polyester resins may include aromatic acids, esters or anhydrides. Suitable aromatic acids, esters and anhydrides include aromatic polycarboxylic acids, esters and anhydrides such as phthalic acid and its anhydride, isophthalic acid, terephthalic acid and its dimethyl ester, benzophenone dicarboxylic acid, diphenic acid, 4,4-dicarboxydiphenyl ether, 2,5-pyridine dicarboxylic acid, 2,6-naphthalenedicarboxylic acid and its dimethyl ester, 4-hydroxybenzoic acid, trimellitic acid and its anhydride, etc. It is believed that dicarboxylic acids having a 1,3-ring structure are preferred to acids having 1,2 or 1,4-ring structure. For example, an isophthalic acid (benzene 1,3-dicarboxylic acid) is preferred over terephthalic acid (1,4-benzene dicarboxylic acid) and phthalic acid (benzene 1,2-dicarboxylic acid). Presently preferred aromatic, dicarboxylic acid includes phthalic acid and its anhydride, and isophthalic acid. Isophthalic acid is presently more preferred.

If desired, or for certain end-use performance or cost considerations, the amount of acid component of the polyester resin may be adjusted by the addition of terephthalic acid and/or adipic acid.

Preferably, the amount of aromatic, dicarboxylic acid in the acid component is greater than about 85 weight percent, more preferably greater than about 90 weight percent, and most preferably greater than about 95 weight percent.

The amount of acid component useful in the polyester resin of the present invention is preferably between about 50 and 75 weight percent, more preferably between about 55 and 70 weight percent, and most preferably between about 60 and 70 weight percent based on total weight of the polyester resin.

Typical diols useful in the present invention include diols having symmetric or asymmetric structures. In general, symmetric diols are believed to have a tendency to crystallize out of solution while asymmetric diols are believed to resist crystallization out of solution. We have discovered that a blend of a selection of one or more of the symmetric and asymmetric diols provides the needed storage stability to the polyester resin. By 'storage stability' is meant that the polyester resin composition of the present invention is preferably not likely to crystallize out of solution when stored at room temperature for at least 6 months and without stirring. We have also discovered that a careful combination of symmetric and asymmetric diols provides the desired glass transition temperature for the polyester resin of the present invention. As used in the present invention, polyester resins having a $T_g$ greater than about 35° C. are considered "hard," and polyester resins having a $T_g$ lower than about 35° C. are considered "soft." Hard polyester resins are believed to offer less flexibility than may be required for optimum performance of the coating composition of the present invention. Likewise, soft polyester resins are believed to offer an increased susceptibility to dirt buildup. We have discovered a combination that is particularly effective in providing a polyester resin having both increased flexibility and the required durability for its intended purpose.

Typically, the present invention is a blend of symmetric and asymmetric diols. Preferably, the amount of symmetric diols present in the polyester resin of the present invention is greater than 50 weight percent, more preferably greater than 60 weight percent, and most preferably greater than 65 weight percent based on the weight of polyols present in the polyester resin. Preferably, the amount of asymmetric diols present in the polyester resin of the present invention is greater than about 20 weight percent, more preferably greater than about 25 weight percent, and most preferably greater than about 30 weight percent based on the weight of polyols present in the polyester resin.

Examples of suitable symmetric diols include ethylene glycol, diethylene glycol, triethylene glycol, dipropylene glycol, 1,3-propane diol, neopentyl glycol, cyclohexane dimethanol (CHDM), hydroxypivalyl hydroxypivalate (HPHP), 1,4-butanediol, 1,5-pentanediol, 1,6-hexanediol, and the like.

Examples of suitable asymmetric diols include 1,2-propylene glycol, 2-methyl-1,3-propanediol, 2-butyl-2-ethyl-1,3-propanediol, 1 ,2-butanediol, 1,3-butanediol, 1 ,2-pentanediol, 1,3-pentanediol, 1 ,4-pentanediol, 2,2-dimethyl-1,3-hexanediol, 2-methyl-2,4-pentanediol, 2,2,4-trimethyl-1-3-pentanediol, and the like.

Without being limited to theory, it is believed that the careful selection of the amount of symmetric and asymmetric diols used in the polyester resin of the present invention contributes to the desired durability of the coating composition. It is foreseeable that variations to these amounts may be made to achieve a desired durability, and this invention is not so limited.

For example, 2-methyl-1,3-propanediol (MPDiol) is an asymmetric diol that can create storage stable (i.e., non-crystallizing) polyester resin solutions. Unfortunately, polyester resins made using only this diol suffer from low glass transition temperatures ($T_g$) and have a tendency to accumulate dirt build-up. In contrast, symmetric diols such as 1,3-propanediol (PDO) and 2,2-dimethyl 1,3-propanediol (neopentyl glycol or NPG) have been used to make higher $T_g$ polyester resins that are prone to crystallize out of solution. We have surprisingly discovered that a polyester resin solution can be made using a unique blend of diols that result in a dirt resistant coating that is also storage stable.

In one embodiment, the polyester resin is manufactured using one or more asymmetric diols (e.g., 2-methyl-1,3-propanediol), and one or more symmetric diols (e.g., 1,3-propanediol and neopentyl glycol). For this embodiment, the amount of 2-methyl-1,3-propanediol is preferably between about 20 and 45 weight percent based on the weight of polyols, more preferably between about 25 and 40 weight percent, and most preferably between about 30 and 35 weight percent. The amount of 1,3-propanediol is preferably between about 15 and 40 weight percent based on the weight of polyols, more preferably between about 20 and 35 weight percent, and most preferably between about 25 and 30 weight percent. The amount of neopentyl glycol is preferably between about 25 and 50 weight percent, more preferably between about 30 and 45 weight percent, and most preferably between about 35 and 40 weight percent based on weight of polyols.

Preferred polyester resins have hydroxyl numbers of from about 20 to 50, more preferably from about 20 to 45, and most preferably from about 20 to 35. Preferred polyester resins have acid numbers from about 2 to 20, more preferably between about 2 and 10.

The number average molecular weight (Mn) of the polyester resin suitably may range from about 1,000 to 20,000, preferably between about 1,500 and 10,000 and most preferably between about 2,500 and 5,000.

Suitable polyester resins have high glass transition temperatures ($T_g$). Polyester resins with high glass transition temperatures are believed to provide increased resistance to outdoor elements, thus providing increased durability. Preferred polyester resins have glass transition temperature of at least about 35° C., more preferably between about 40° C. and 60° C. and most preferably between about 40° C. and 50° C.

The polyester resins may be produced by any of the conventional processes, preferably with the use of a catalyst as well as passage of an inert gas through the reaction mixture. Esterification takes place almost quantitatively and may be monitored by determining the acid and/or hydroxyl numbers or by monitoring the Gardner-Holt viscosity of the product.

The polyester resins are typically made up in organic solvents, such as 1-methyoxy-2-propanol acetate, propylene glycol monomethyl ether acetate, cyclohexanone, xylene, high boiling aromatic solvents, such as AROMATIC 100 and 150, etc., and mixtures thereof. Suitably, the organic solvent useful for the present invention is a mixture of a high boiling aromatic solvent and propylene glycol monomethyl ether acetate. The ratio of the high boiling aromatic solvent to propylene glycol monomethyl ether acetate in the mixture is preferably between about 70:30 and 95:5, more preferably between about 75:25 to 90:10, and most preferably between about 80:20 to 90:10.

If desired, the binder may further comprise an optional crosslinker compound. The optional crosslinker compound may be used to facilitate cure of the coating and to build desired physical properties. Suitable crosslinker compounds include aromatic and non-aromatic crosslinker compounds.

Polyester resins having hydroxyl groups are curable through the hydroxyl groups, e.g., (i) with aminoplasts, which are oligomers that are the reaction products of aldehydes, particularly formaldehyde, or (ii) with amino- or amido-group-carrying substances exemplified by melamine, urea, dicyandiamide, benzoguanamine and glycoluril, or (iii) with blocked isocyanates. Hydroxyl crosslinking agents are also described, for example in U.S. Pat. No. 2,940,944 and German patent applications 1,060,596, 1,083,548 and 1,089,549.

Suitable crosslinker compounds include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used for combining with the polyester resins. Suitable amino crosslinking agents include those sold by Cytek under the trademark CYMEL (e.g., Cymel 301, Cymel 303, and Cymel 385 alkylated melamine-formaldehyde resins, or mixtures or such resin, are useful) or by Solutia under the trademark RESIMENE. Hydroxyl-reactive crosslinking agents are generally provided in an amount sufficient to react with at least one-half the hydroxyl groups of the polyester resin, i.e., to represent at least one-half the stoichiometric equivalent of the hydroxyl functionality. Preferably, the crosslinking agent is sufficient to substantially completely react with all of the hydroxyl functionality of the polyester resin. Crosslinking agents having nitrogen crosslinking functionality may be provided in amounts of from about 2 to about 12 equivalents of nitrogen crosslinking functionality per equivalent of hydroxyl functionality of the polyester resin. This typically translates to an aminoplast being provided at between about 10 and about 70 phr.

Suitable crosslinker compounds also include blocked isocyanates. U.S. Pat. No. 5,246,557, which is herein incorporated by reference, describes some suitable blocked isocyanates. Blocked isocyanates are isocyanates in which each isocyanate group has reacted with a protecting or blocking agent to form a derivative which will dissociate on heating to remove the protecting or blocking agent and release the reactive isocyanate group. Suitable compounds used as blocking agents for polyisocyanates include aliphatic, cycloaliphatic or aralkyl monohydric alcohols, hydroxylamines and ketoximes. Preferred blocked polyisocyanates dissociate at temperatures of around 160° C. or lower. Lower dissociation temperatures are desirable (assuming the coating is still stable at ambient temperatures) for energy savings reasons and where heat sensitive materials are being utilized.

In addition to the polyester resin and optional crosslinker compound, the coating composition may contain up to about 60 weight percent pigments and optional fillers. Suitably, the pigment:binder weight ratio is preferably at least 0.9:1, more preferably at least 0.95:1 and most preferably at least 1:1. In a preferred embodiment, the pigment:binder weight ratio does not exceed about 1.4:1.

Appliance fixtures and rain gutters, for example, are available in a variety of colors. Suitable colors may be modified as required for aesthetics and/or end use applications. For example, rain gutters may be made available in different colors to match the variety of building colors. For a typically white rain gutter (or appliance), a white pigment (such as $TiO_2$) may be incorporated in the binder to obtain the desired color. If desired, the $TiO_2$ may be surface treated. The surface treatment used may be chosen to fit the particular purpose of the coating. For example, a coating made for an interior application may use a different treatment than one designed for exterior usage.

Other additives known in the art, such as flow modifiers, viscosity modifiers and other binders may be dispersed in the coating composition. A catalytic amount of a strong acid (e.g., p-toluenesulfonic acid) may be added to the composition to hasten the cross-linking reaction.

The coating composition preferably has a pencil hardness of at least H, more preferably at least 2H, and most preferably at least 3H when tested as described herein.

The coating composition preferably has a flexibility of at least 3T with no tape off, more preferably at least 2T with no tape off, most preferably at least 1T with no tape off, and optimally 0T with no tape off. Flexibility may be achieved by using polyester resins having functionality less than 3, thereby providing limited branching. Typically, the desired branching may be achieved by using diols of functionality greater than 2.

The coating composition preferably has a Delta L durability as described below of less than about 3, more preferably less than about 2, most preferably less than about 1.7, and optimally less than about 1 when compared between exposed and unexposed panels.

The coating composition may further comprise one or more solvents. Suitable solvents include 1-methoxy-2-propanol acetate, cyclohexanone, xylene, alcohol (e.g., butanol), high boiling aromatic solvents, such as AROMATIC 100, 150 and 200, etc., and mixtures thereof.

The coating composition thus obtained may be applied to a substrate coil. As used in the present invention, a "substrate coil" includes both (i) a planar sheet of metal and (ii) a roll of metal that may be unwound, coated, and re-rolled. In either case, the substrate coil may be used as skins for appliances, e.g., refrigerators and ranges; architectural metal skins, e.g., gutter stock, window blinds, siding and window frames; and the like. The application process may include spraying, dipping, or brushing but the substrate coil is particularly suited for a coil coating operation wherein the composition is wiped onto the sheet as it unwinds from a coil and then baked as the sheet travels toward an uptake coil winder.

The coating is typically cured or hardened at a temperature from about 100 to 300° C. For coil coating operations the coating is typically baked to a peak metal temperature of from about 210 to 254° C.

The coated substrate coils are subsequently formed into parts as desired and known by those skilled in the art.

The constructions cited were evaluated by tests as follows:

Delta L Durability Test

The coated panels were cut into 10.2 cm.×20.3 cm. (4 in.×8 in.) samples. One set was exposed according to ASTM Practice G 7 in South Florida at 45 degree-angle, south facing. Another set was retained as a reference. After 17 months of outdoor exposure, the panels were then evaluated for color retention. The color (L, a, b-values) of the exposed and unexposed panels were measured using a Hunter D25-9 Colorimeter (Hunter Associates Laboratory) at a 10 degree observation angle and D 65 illuminant. The differences (Delta L) between the exposed and unexposed panels were recorded.

Solvent Resistance

The solvent resistance (double rub) of the coated panels was measured according to ASTM D 5402 using Methyl ethyl ketone (MEK) as the solvent. A 15.2 cm.×25.4 cm. (6 in.×10 in.) coated panel was manually rubbed in a back-and-forth motion using a clean cotton cheesecloth soaked in MEK. The number of double rubs (one back-and-forth motion) to failure was recorded. Failure occurs when the coating is broken through to reveal the substrate panel. The test was discontinued if no failure is shown after 100 double rubs. When discontinued for no failure, the result is recorded as >100.

Reverse Impact

The coated panels were subjected to reverse impact testing at room temperature according to ASTM D 2794. A 15.2 cm.×25.4 cm. (6 in×10 in.) coated panel was impacted with a 1.6 cm. (0.625 in.) diameter punch and 6.8 N-m. (60 in-lb) force. A pressure sensitive tape (Scotch Brand #610, available from 3M Company) was applied to the indented area (dimple) and snapped off. Failure occurs when the snapped off tape picks off the coated substrate. When no failure occurs, the result is recorded as "No Tape Off" (NTO).

Flexibility

The coated panels were subjected to flexibility testing according to ASTM D 4145. The sample size used was 15.2 cm.×25.4 cm. (6 in×10 in.). The sample was bent across the rolling direction of the metal and subjected to tape adhesion testing using a pressure sensitive tape (Scotch Brand #610, available from 3M Company) The minimum T-bend with No Tape Off (NTO) was recorded. "No Tape Off" denotes no coating pick-off on the pressure sensitive tape from the tape adhesion testing.

Hardness

The pencil hardness of the coating was measured according to ASTM D 3363. The panel size used was 15.2 cm.×25.4 cm. (6 in×10 in.). The hardness of a pencil pressed at a 45-degree angle that would not gouge the coated film was recorded.

Gloss Retention

The gloss retention of the panels was measured according to ASTM D 523. The gloss reading at glossmeter geometry of 60-degrees was taken of the exposed (weathered) and unexposed retain panel. The gloss retention percentage was calculated for each panel according to the formula: (Gloss of exposed panel/gloss of unexposed panel)×100.

The following examples are offered to aid in understanding of the present invention and are not to be construed as limiting the scope thereof. Unless otherwise indicated, all parts and percentages are by weight.

EXAMPLES

Example 1

Preparation of a Comparative Polyester Material

In a suitable flask equipped with an agitator, packed column, condenser, thermometer, and an inert gas inlet, was charged 7.1 moles of neopentyl glycol, 3.1 moles of adipic acid, 3.8 moles of isophthalic acid and 1.7 moles of phthalic anhydride. 0.1 part by weight of dibutyl tin oxide was then added. The reactor was flushed with inert gas (Nitrogen) and heated to 220° C. and held at that temperature for 5 hours while removing water. After the reaction mixture was clear, azeotropic distillation was started using an aromatic hydrocarbon fraction (xylene) until an acid number lower than 10 was achieved.

The polyester product had an acid number of 8.0. The viscosity, measured as a 65% solution in AROMATIC 150 was Z1 using a Gardner Bubble scale.

Example 2

Preparation of a Polyester Material

In a suitable flask equipped with an agitator, packed column, condenser, thermometer, and an inert gas inlet, was charged 2 moles of MPDiol, 3.3 moles of neopentyl glycol, 3.3 moles of isophthalic acid and 1.7 moles of phthalic anhydride. 0.1 part by weight of dibutyl tin oxide was then added. The reactor was flushed with inert gas (Nitrogen) and heated to 235° C. and held at that temperature for 4.5 hours while removing water. After the reaction mixture was clear, azeotropic distillation was started using an aromatic hydrocarbon fraction (xylene) until an acid number lower that 2 was achieved.

The polyester product had an acid number of 1.3. The viscosity, measured as a 50.7% solution in AROMATIC 150/Propylene glycol monomethyl ether acetate (84/16) was P using a Gardner Bubble scale.

Example 3

Preparation of Polyester Material

In a suitable flask equipped with an agitator, packed column, condenser, thermometer, and an inert gas inlet, was charged 3.0 moles of MPDiol, 3.0 moles of neopentyl glycol, 8.4 moles of isophthalic acid and 3.0 moles of 1,3-propanediol. 0.1 part by weight of dibutyl tin oxide was then added. The reactor was flushed with inert gas (Nitrogen) and heated to 235° C. and held at that temperature for 4.5 hours while removing water. After the reaction mixture was clear, azeotropic distillation was started using an aromatic hydrocarbon fraction (xylene) until an acid number lower than 2 was achieved.

The polyester product had an acid number of 1.9. The viscosity, measured as a 50.2% solution in AROMATIC 150/Propylene glycol monomethyl ether acetate (84/16) was V+ using a Gardner Bubble scale.

Examples 4 to 6

Preparation of Coating Compositions

In a suitable container equipped with a high speed disperser blade, Titanium Dioxide (obtainable as R960 from DuPont) pigment was added to the polyester material of Example 1, 2 and 3, with Example 1 used to prepare Example 4, Example 2 used to prepare Example 5 and Example 3 used to prepare Example 6. Each composition was then mixed at high speed using a high-speed disperser blade for 10 minutes. Each mixture was then further dispersed to a Hegman grind of at least 7 using a zirconium bead grinding media. Melamine resin, solvents and other additives were added and mixed for 10 minutes. The compositions were mixed to a uniform dispersion.

TABLE 4 to 6

Components of Coating Composition

| Component | Weight Percent |
| --- | --- |
| Polyester Resin | 31.7 |
| Titanium Dioxide | 29.9 |
| Melamine Resin | 5.4 |
| Solvents | 32.0 |
| Additives | 1.0 |

Examples 7 to 9

Preparation of the Panels

Hot-dip galvanized steel (HDG) panels, 25.4 cm.×15.2 cm.×0.05 cm. (10 in.×6 in.×0.019 in.), were cleaned and pretreated with a commercial oxide pretreatment and chrome rinse, and primed with a commercial polyester anti-corrosive primer on a coil line. The coating compositions of Examples 4, 5, and 6 were used to prepare Examples 7, 8, and 9 respectively. The coating compositions were applied to the substrate by drawdown using a wire-wound rod to achieve a dry film thickness of 0.7-0.8 mils. The coated substrates were then baked for 20 seconds at 232° C. peak metal temperature, and quench-cooled in a water-bath at room temperature. The cooled coated panels were dried using a clean paper towel.

TABLE 7-9

Evaluation of Coating Compositions

| Ex. # | Gloss Retention | Solvent Resistance | Flexibility | Reverse Impact Resistance | Hardness | Delta L |
| --- | --- | --- | --- | --- | --- | --- |
| 7 | 84 | >100 | 0T | NTO | F | −3.71 |
| 8 | 92 | >100 | 0T | NTO | H | −1.69 |
| 9 | 91 | >100 | 0T | NTO | H | −1.00 |

Having thus described the preferred embodiments of the present invention, those of skill in the art will readily appreciate that the teachings found herein may be applied to yet other embodiments within the scope of the claims hereto attached. The complete disclosures of all patents, patent documents, and publications are incorporated herein by reference as if individually incorporated.

What is claimed is:

1. A coated substrate, comprising: a substrate coil, and a coating composition applied to at least one major surface of the substrate coil,
    wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, wherein the polyester resin comprises between about 50 and 75 weight percent isophthalic acid based on the total weight of resin and has a glass transition temperature of at least about 35° C.;
    wherein the symmetric diol includes both 1,3-propanediol and neopentyl glycol; and wherein the flexibility of the coated substrate is at least 1T with no tape off.

2. The coated substrate of claim 1, wherein the coating has a flexibility of 0T with no tape off, and a hardness of at least H.

3. A coated substrate, comprising: a substrate coil, and a coating composition applied to at least one major surface of the substrate coil,
    wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, wherein the polyester resin comprises between about 50 and 75 weight percent isophthalic acid based on the total weight of resin and has a glass transition temperature of at least about 35° C.;
    wherein the asymmetric diol comprises 2-methyl-1,3-propanediol; and
    wherein the flexibility of the coated substrate is at least 1T with no tape off.

4. The coated substrate of claim 3, wherein the coating composition when formulated to an initial white color and exposed outdoors in South Florida for 17 months at a 45 degree angle facing south, has an L value color change less than about 3 units compared to an unexposed panel.

5. A coated substrate, comprising: a substrate coil, and a coating composition applied to at least one major surface of the substrate coil,
  wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, wherein the polyester resin comprises between about 50 and 75 weight percent isophthalic acid based on the total weight of resin and has a glass transition temperature of at least about 35° C.;
  wherein the polyester resin comprises between about 15 and 40 weight percent 1,3-propanediol, between about 20 and 45 weight percent 2-methyl-1,3-propanediol, and between about 25 and 50 weight percent neopentyl glycol based on the total weight of polyols; and
  wherein the flexibility of the coated substrate is at least 1T with no tape off.

6. A coated substrate, comprising: a substrate coil, and a coating composition applied to at least one major surface of the substrate coil,
  wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, wherein the polyester resin has a glass transition temperature of at least about 35° C.;
  wherein the symmetric diol includes both 1,3-propanediol and neopentyl glycol; and
  wherein the flexibility of the coated substrate is at least 1T with no tape off.

7. A coated substrate, comprising: a substrate coil, and a coating composition applied to at least one major surface of the substrate coil,
  wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, wherein the polyester resin has a glass transition temperature of at least about 35° C. and comprises between about 15 and 40 weight percent 1,3-propanediol, between about 20 and 45 weight percent 2-methyl-1,3-propanediol, and between about 25 and 50 weight percent neopentyl glycol based on the total weight of polyols; and
  wherein the flexibility of the coated substrate is at least 1T with no tape off.

8. A coated substrate, comprising: a substrate coil, and a coating composition applied to at least one major surface of the substrate coil,
  wherein the coating composition comprises a binder comprising a polyester resin that is formed using at least one aromatic dicarboxylic acid and using polyols comprising at least one symmetric diol in an amount greater than 50 weight percent based on the total weight of polyols and at least one asymmetric diol in an amount greater than 25 weight percent based on the total weight of polyols, wherein the aromatic dicarboxylic acid comprises isophthalic acid, the isophthalic acid is greater than 85 weight percent based on the total weight of acids and the polyester resin has a glass transition temperature of at least about 35° C.; and
  wherein the flexibility of the coated substrate is at least 1T with no tape off.

9. A coating composition, comprising:
  a binder, wherein the binder comprises a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, and optionally a crosslinker, wherein the polyester resin comprises between 50 and 75 weight percent isophthalic acid based on the total weight of binder and wherein the coating composition is storage stable, has a glass transition temperature of at least about 35° C. and when applied to a coil and hardened will have a flexibility of at least 1T with no tape off, and wherein the aromatic dicarboxylic acid component is greater than about 85 weight percent based on the total weight of acid, the symmetric diol comprises 1,3-propanediol and the asymmetric diol comprises 2-methyl-1,3-propanediol.

10. A coating composition, comprising:
  a binder, wherein the binder comprises a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, and optionally a crosslinker, wherein the polyester resin comprises between 50 and 75 weight percent isophthalic acid based on the total weight of binder and wherein the coating composition is storage stable, has a glass transition temperature of at least about 35° C. and when applied to a coil and hardened will have a flexibility of at least 1T with no tape off, and
  wherein the symmetric diol includes both 1,3-propanediol and neopentyl glycol.

11. The coating composition of claim 10, wherein the coating composition further comprises an adjuvant selected from the group consisting of: pigment, flow modifiers, viscosity modifiers, or combinations thereof.

12. The coating composition of claim 10, wherein the symmetric diol amount is greater than 60 weight percent based on the total weight of polyols and the asymmetric diol amount is greater than 25 weight percent based on the total weight of polyols.

13. The coating composition of claim 10, wherein the symmetric diol amount is greater than 65 weight percent based on the total weight of polyols and the asymmetric diol amount is greater than 30 weight percent based on the total weight of polyols.

14. The coating composition of claim 10, wherein the binder further comprises a crosslinking agent.

15. The coating composition of claim 14, wherein the crosslinking agent comprises a melamine formaldehyde resin.

16. A coating composition, comprising:
a binder, wherein the binder comprises a polyester resin that is formed using at least one aromatic dicarboxylic acid and using polyols comprising at least one symmetric diol in an amount greater than 50 weight percent based on the total weight of polyols and at least one asymmetric diol in an amount greater than 20 weight percent based on the total weight of polyols, and optionally a crosslinker, wherein the polyester resin comprises between 50 and 75 weight percent isophthalic acid based on the total weight of binder and wherein the coating composition is storage stable, has a glass transition temperature of at least about 35° C. and when applied to a coil and hardened will have a flexibility of at least 1T with no tape off, and
wherein the asymmetric diol comprises 2-methyl-1,3-propanediol.

17. The coating composition of claim 16, wherein the glass transition temperature of the polyester resin is at least about 40° C.

18. The coating composition of claim 16, wherein the number average molecular weight of the polyester resin is between about 2,500 and 5,000.

19. The coating composition of claim 16, wherein the binder comprises a blend of an aromatic solvent and propylene glycol monomethyl ether acetate.

20. The coating composition of claim 16, wherein the hydroxyl number of the polyester resin is between about 20 and 50.

21. The coating composition of claim 16, wherein the symmetric diol amount is greater than 60 weight percent based on the total weight of polyols and the asymmetric diol amount is greater than 25 weight percent based on the total weight of polyols.

22. The coating composition of claim 16, wherein the symmetric diol amount is greater than about 65 weight percent based on the total weight of polyols and the asymmetric diol amount is greater than about 30 weight percent based on the total weight of polyols.

23. The coating composition of claim 16, wherein the polyester resin comprises between about 15 and 40 weight percent 1,3-propanediol, between about 20 and 45 weight percent 2-methyl-1,3-propanediol, and between about 25 and 50 weight percent neopentyl glycol based on the total weight of polyols.

24. The coating composition of claim 16, wherein the binder further comprises a crosslinking agent.

25. The coating composition of claim 24, wherein the crosslinking agent comprises a melamine formaldehyde resin.

* * * * *